Patented Aug. 7, 1945

2,381,562

UNITED STATES PATENT OFFICE 2,381,562

ISOMERIZATION OF PARAFFIN HYDROCARBONS

Meredith M. Stewart, Beacon, N. Y., assignor to The Texas Company, New York, N. Y., a corporation of Delaware No Drawing. Application September 19, 1942, Serial No. 458,995

8 Claims. (Cl. 260—683.5)

This invention relates to an improved process of isomerizing paraffin hydrocarbons, particularly a process wherein straight chain paraffin hydrocarbons are treated to produce branched-chain hydrocarbons.

It has been discovered in accordance with the invention that valuable contact masses can be obtained by reacting a catalyst support comprising alumina, particularly "activated" alumina, with hydrogen fluoride, preferably an aqueous solution of hydrofluoric acid, to produce aluminum fluoride on the surface of the support, and then impregnating the support with aluminum chloride.

While the invention is not limited to any theory of operation, it appears that the primary result of the treatment with hydrogen fluoride is to form a coating of aluminum fluoride on the support. The treatment also appears to activate the support and increase its surface area. The contact masses of the invention, therefore, may be defined as comprising a support comprising alumina, which is preferably in the form of particles, containing aluminum fluoride on the surface and impregnated with aluminum chloride. The aluminum fluoride is generally present in a relatively small amount, for example, from about 2 to 12 per cent of the weight of the contact mass, while the aluminum chloride is generally present in amounts corresponding to from about 10 to 30 per cent of the weight of the contact mass.

These contact masses are adapted for use in various processes such as isomerization, alkylation, cracking, and polymerization processes for the treatment of hydrocarbons, and in general in the types of processes in which aluminum chloride has found use. It has been found that the contact masses are especially valuable when employed for isomerization; i. e., a process resulting in increasing the branching of hydrocarbon molecules. Thus, as compared with contact masses consisting of "activated" alumina impregnated with aluminum chloride, the contact masses have the unique property of catalyzing the isomerization reaction to give at least equivalent yields of the desired products while at the same time causing no or very little cracking or formation of hydrocarbons of a lesser number of carbon atoms than the charge stock.

The contact masses may be prepared by immersing "activated" alumina particles in an aqueous solution of hydrofluoric acid until an amount of aluminum fluoride of about the above order is produced on the surface of the particles, drying and preferably calcining, and then impregnating the particles with aluminum chloride. This may be done by bringing the treated particles at atmospheric or at a higher pressure into contact with vapors of aluminum chloride.

Isomerization reactions in which the contact masses may be employed may be of various types such as vapor phase and liquid phase reactions carried out as batch processes or as continuous processes. In these processes the pressure maintained may vary from about atmospheric to about 300 pounds per square inch.

In general, the temperatures should be relatively low, for example, from about 100° to 300° F., but are usually varied in accordance with the hydrocarbon charge stock. When isomerizing a feed hydrocarbon consisting essentially of normal butane a temperature within the range of about 190 to 225° F. may be employed, preferably a temperature within the range of about 200 to 215° F. If the feed consists essentially of normal pentane the temperature employed may be in the range of about 100 to 250° F. and preferably is about 130° F. In a particular case the optimum temperature, of course, will depend upon the contact time used.

Promoters comprising or yielding hydrogen halides may be used in the reaction. Hydrogen chloride is an effective promoter and is usually preferred.

A representative catalyst of the invention can be prepared in the following manner. 1000 parts by weight of activated alumina of 4 to 8 mesh particle size (a commercial "activated" alumina sold under the trade-name Alorco "A") were wet with water and were then covered with a solution containing 200 parts by weight of a 48 per cent solution of hydrofluoric acid in 2000 parts by weight of water. The resulting mixture was allowed to stand for two days and the solution was decanted. The treated alumina was dried and then calcined at 800° F. 300 parts by weight of anhydrous aluminum chloride were placed in an autoclave and the calcined material prepared as above described was introduced into the autoclave. The autoclave was then closed, evacuated, and heated for three hours to a pressure of 135 pounds per square inch. The autoclave was then cooled to room temperature and the contact mass was removed. Analysis of the contact mass indicated that it contained about 47 per cent alumina, 13 per cent chlorine, and 6 per cent fluorine by weight.

This contact mass was employed for the isomerization of normal butane to isobutane. This process was carried out by introducing 200 parts by weight of the contact mass into a reaction tower maintained at a temperature of about 212° F. and at a pressure of about 150 to 175 pounds per square inch. Thereafter, over a two-hour period 165 parts by weight of normal butane and 2 per cent of hydrogen chloride based on the weight of butane were passed through the tower. The product obtained was collected and subjected to low temperature fractional distillation. The product was found to contain 60.1 mol per cent isobutane, 34.7. mol per cent normal butane and there was a residue of 5.2 mol per cent. None of the product boiled below isobutane.

In a similar run carried out under substantially the same conditions a product was obtained containing 53.4 mol per cent isobutane, 43 mol per cent normal butane and a residue of 3.3 mol per cent. In this case 0.3 mol per cent of the product boiled below isobutane.

As contrasted with these results, in a run using a contact mass prepared by impregnating "activated" alumina with aluminum chloride without pretreating the alumina with hydrofluoric acid, a product was obtained containing 52 mol per cent isobutane, 33.8 mol per cent normal butane and 4.8 mol per cent residue. However, in this case 9.4 mol per cent of the product boiled below isobutane.

It will thus be seen that the contact masses of the invention possess the important advantage of efficiently catalyzing the isomerization of normal butane to isobutane while eliminating or materially reducing the amount of cracking accomplished.

It will be understood that the invention is not limited to the details of the above examples and that similar contact masses may be prepared by other procedures. For example, the invention includes processes using other fluorine-containing materials provided such materials upon hydrolysis yield hydrofluoric acid. As examples of such materials there may be mentioned various fluorides of weak bases such as ammonium fluoride, and also fluorine itself. In the use of such materials the treatment of the alumina support preferably is carried out in the presence of water or water vapor. When using aqueous hydrofluoric acid various strengths of acid may be employed provided that the solution used is capable of reacting with the support to form aluminum fluoride. Generally solutions of hydrofluoric acid from 4 to 10 per cent concentration are satisfactory.

With respect to the nature of the support, it will be recognized that the invention extends to contact masses prepared using supports composed of other materials comprising alumina. For example, while "activated" alumina is an especially pure and active grade of alumina, other grades of alumina may be used.

Since the effect of the treatment with the hydrofluoric acid appears to be primarily the formation of a coating of aluminum fluoride on the surface of the particles of the support, it will be understood that the invention includes the use of contact masses in which this coating is placed by other procedures such as an impregnation procedure.

Obviously many modifications and variations of the invention, as hereinbefore set forth, may be made without departing from the spirit and scope thereof, and therefore only such limitations should be imposed as are indicated in the appended claims.

I claim:

1. A process of isomerizing paraffin hydrocarbons to increase the branching thereof which comprises contacting said hydrocarbons at isomerizing temperatures with a contact mass comprising a catalyst support comprising alumina having aluminum fluoride on its surface and impregnated with aluminum chloride.

2. A process of isomerizing paraffin hydrocarbons to increase the branching thereof which comprises contacting said hydrocarbons at isomerizing temperatures with a contact mass comprising a catalyst support comprising alumina and pretreated with hydrogen fluoride to form aluminum fluoride on the surface of said support, said pretreated catalyst support being impregnated with aluminum chloride.

3. A process of isomerizing paraffin hydrocarbons to increase the branching thereof which comprises contacting said hydrocarbons at isomerizing temperatures with a contact mass comprising a catalyst support consisting essentially of alumina having aluminum fluoride on its surface and impregnated with aluminum chloride.

4. A process of isomerizing paraffin hydrocarbons to increase the branching thereof which comprises contacting said hydrocarbons at isomerizing temperatures with a contact mass comprising particles of "activated" alumina pretreated with hydrofluoric acid to form aluminum fluoride on the surface of said particles, and impregnated with aluminum chloride.

5. A process of isomerizing normal butane to isobutane which comprises passing vapors of normal butane at isomerizing temperatures into contact with a contact mass comprising a catalyst support comprising alumina having aluminum fluoride on its surface and impregnated with aluminum chloride.

6. A process of isomerizing normal butane to isobutane which comprises passing vapors of normal butane at isomerizing temperatures into contact with a contact mass comprising a catalyst support consisting essentially of alumina having aluminum fluoride on its surface and impregnated with aluminum chloride.

7. A process of isomerizing normal butane to isobutane which comprises passing vapors of normal butane and a hydrogen halide promoter at isomerizing temperatures within the range of about 190° to 225° F. into contact with a contact mass comprising a catalyst support consisting essentially of alumina having aluminum fluoride on its surface and impregnated with aluminum chloride.

8. A process of isomerizing normal butane to isobutane which comprises passing vapors of normal butane and a hydrogen halide promoter at isomerizing temperatures within the range of about 190° to 225° F. into contact with a contact mass comprising particles of "activated" alumina pretreated with hydrofluoric acid to form aluminum fluoride on the surface of said particles, and impregnated with aluminum chloride.

MEREDITH M. STEWART.